(12) United States Patent
Long et al.

(10) Patent No.: US 9,086,286 B2
(45) Date of Patent: Jul. 21, 2015

(54) GOGGLES FOR USE IN WATER

(71) Applicants: Rodney Wayne Long, Cypress, TX (US); William J. Darnell, Cypress, TX (US); Aaron Robert Palaian, Katy, TX (US); Trevor G. Grove, Houston, TX (US)

(72) Inventors: Rodney Wayne Long, Cypress, TX (US); William J. Darnell, Cypress, TX (US); Aaron Robert Palaian, Katy, TX (US); Trevor G. Grove, Houston, TX (US)

( * ) Notice: Subject to any disclaimer, the term of this patent is extended or adjusted under 35 U.S.C. 154(b) by 0 days.

(21) Appl. No.: 13/947,091

(22) Filed: Jul. 21, 2013

(65) Prior Publication Data
US 2015/0025794 A1    Jan. 22, 2015

(51) Int. Cl.
G08G 1/123    (2006.01)
G01C 21/20    (2006.01)
A63B 33/00    (2006.01)

(52) U.S. Cl.
CPC .............. *G01C 21/20* (2013.01); *A63B 33/002* (2013.01)

(58) Field of Classification Search
CPC .............................. G02B 27/017; G06F 3/013
USPC ....................... 701/431; 345/8, 156
See application file for complete search history.

(56) References Cited

U.S. PATENT DOCUMENTS

2013/0222235 A1\* 8/2013 Abdollahi et al. ............ 345/156
2013/0297460 A1\* 11/2013 Spivack ....................... 705/27.2

\* cited by examiner

*Primary Examiner* — Thomas G Black
*Assistant Examiner* — Luke Huynh

(57) ABSTRACT

Goggles for use in water that are configured to guide a person along predetermined courses. The goggles can have a pair of indicators that can be in communication with a microprocessor. The microprocessor can actuate the indicators selectively to guide a person wearing the goggles along a predetermined course.

13 Claims, 11 Drawing Sheets

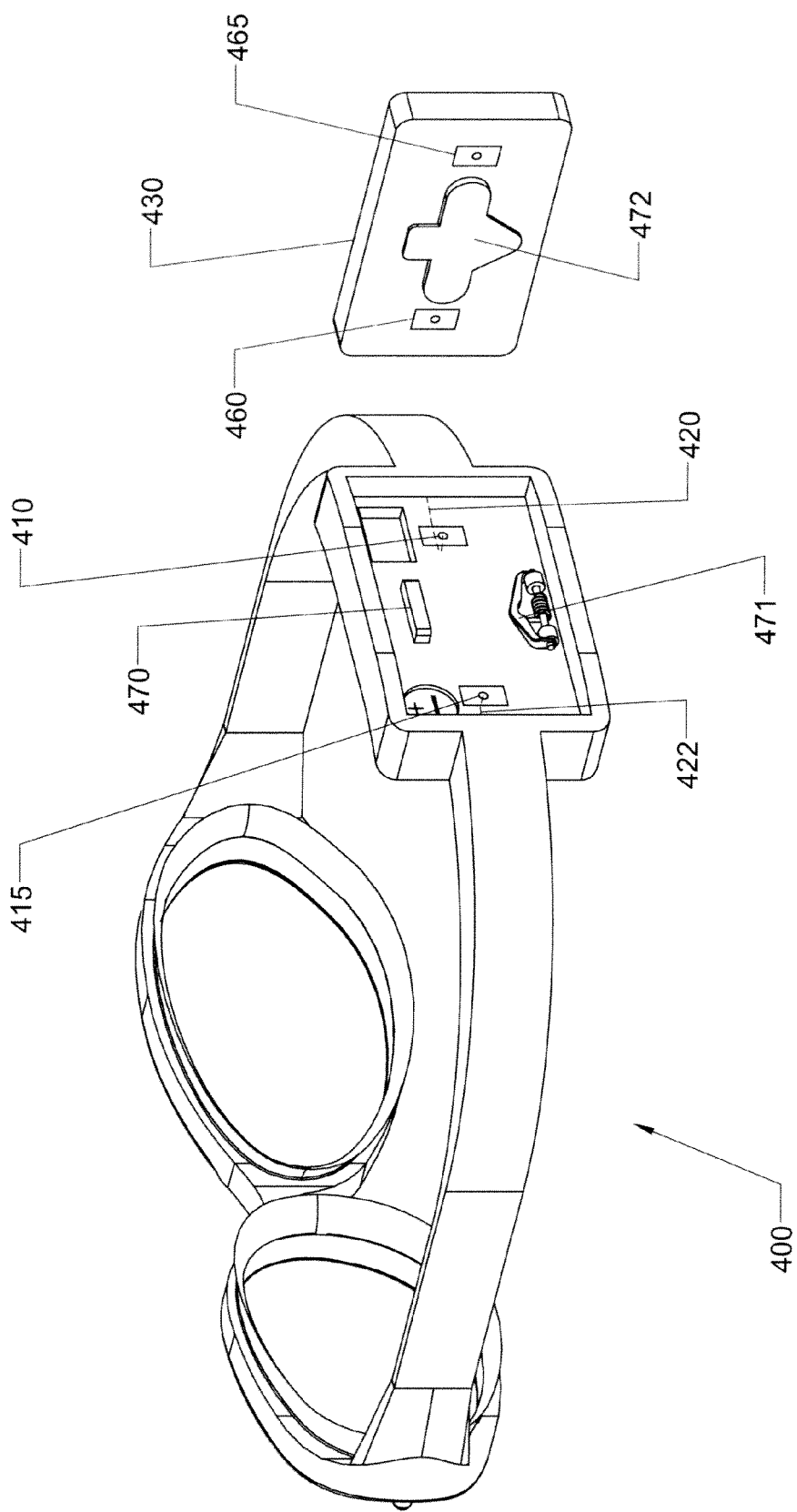

DETAILED DESCRIPTION OF THE PREFERRED EMBODIMENTS

GOGGLES FOR USE IN WATER

FIELD OF THE INVENTION

The present invention relates to goggles with indicators for directing a user.

BACKGROUND OF THE INVENTION

A need exists for goggles that have indicators for indicating what direction a user has to move to stay on a predetermined course.

A further need exists for goggles that have a GPS housing for connecting with a GPS module.

BRIEF DESCRIPTION OF THE DRAWINGS

The present invention will be explained in greater detail with reference to the appended figures, in which:

FIG. 3A depicts an embodiment of the goggles.

Figure 1:
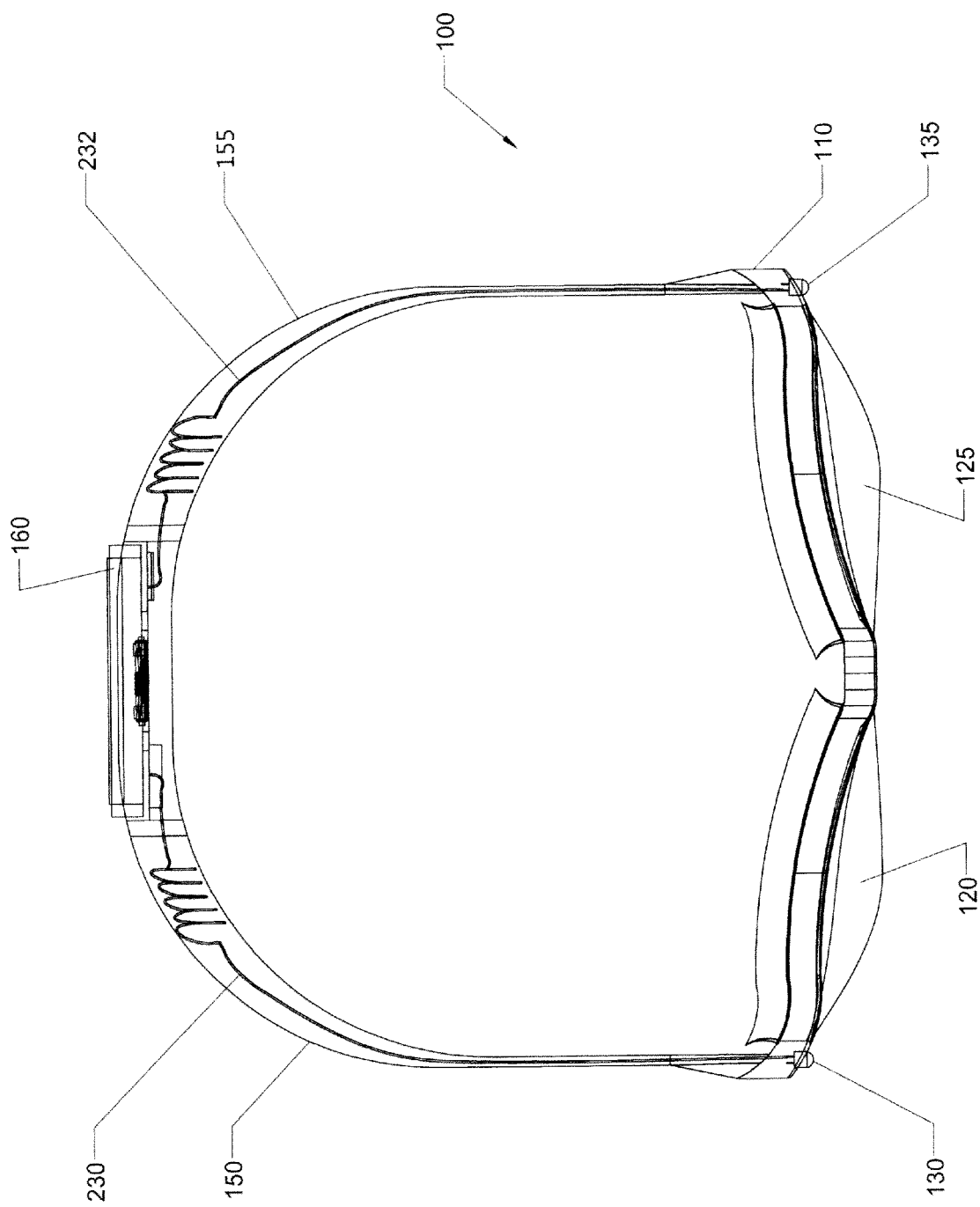
FIG. 1 depicts a schematic of the goggles.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention will become more fully understood from the detailed description given herein below. However, the following description is for purposes of illustration only, and thus is not limitative of the invention.

Goggles for use in water comprising a pair of indicators configured to be actuated by a module connected with the goggles. The module can actuate one of the indicators of the pair of indicators visible to a left eye when a measured coordinate is to the left of a predetermined coordinate, and the module can actuate another of the signal indicators visible to a right eye of the user when a measured coordinate is to the right of the predetermined coordinate. The module can activate the signal indicators by connecting an electrical path to the signal indicators, send an activation signal to the indicators, or the like.

In one or more embodiment, the indicators can be vibrations, lights, or combinations thereof.

The goggles can include a frame. A first lens and a second lens can be operatively secured in the frame.

A first indicator can be adjacent the first lens. Adjacent the first lens can mean connected with the first lens, connected on the frame proximate to the first lens, or otherwise connected with frame such that the first indicator is visible through the first lens.

A second indicator can be adjacent the second lens. Adjacent the second lens can mean connected with the second lens, connected on the frame proximate to the second lens, or otherwise connected with the frame such that the second indicator is visible through the second lens.

The goggles can also include a housing connected with both ends of the frame. The housing can be connected with the frames by a strap. The strap can be an elastic ban, a cloth ban, or the like. The strap can be configured to be adjusted.

The housing can be connected with the indicators. The housing can be connected with the indicators by one or more electric conductors or wirelessly. The electric conductors can be located in a channel formed in the strap connecting the housing to the frames. The electric conductors can be infused into the strap, or the electric conductors can be used to form a portion of the strap. The electric conductors can be nanotubes configured to stretch. Illustrative nanotubes are described in "Buckling of Aligned Carbon Nanotubes as Stretchable Conductors: A New Manufacturing Strategy," was published online Jan. 23, 2012 in Advanced Materials, co-authored by Feng Xu; New Means for Creating Elastic Conductors published in ScienceDaily (Jan. 24, 2012). These references are incorporated herein in their entirety.

The electric conductors can be wires. The wires can be insulated copper or other conductive material. The conductors can be longer than necessary to allow the conductor to expand when the strap is placed on a users head. The electric conductors can be expandable cables. The conductors can be spiraled allowing the spirals to expand and contract.

In another embodiment, a dispensing device can be used to contain a length of electric conductor and the strap is expanded the dispensing device can allow the conductor to run out as necessary then to role the conductor as the strap returns to an original length. For example, the dispenser can be a wheel under a constant spring tension, when force expanding the strap is removed the constant spring can cause the wheel to retract.

A directional indicator system can include the goggles with a module disposed into the housing. The module can have a microprocessor programmed to receive a predetermined course and compare the predetermined course to measured coordinates using GPS technology. The computer instructions can instruct the microprocessor to actuate one of the indicators to direct the user back onto the predetermined course when it is determined that the user has veered off the predetermined course. For example, a course map can be loaded into the microprocessor and the user traverses the course the module can determine the user's location and provide the coordinates to the microprocessor; then the microprocessor can compare coordinates provided by the module to the course map; the microprocessor can compare the course map to the coordinates provided by the module and send an actuation signal to actuate the left indicator to instruct the user to go left if the microprocessor determines that the user has to go left to get on course, send an actuation to the right indicator if the microprocessor determines the user has to go right to get back on course, or not actuate either indicator if the microprocessor determines that the user is on course.

In one or more embodiments, the electric conductors can be connected to the module via a pair of buses. A first bus can quick connect with a first port on the module and a second bus can quick connect with a second port on the module. The first bus can be associated with the first indicator and the second bus can be associated with the second indicator. As such, the microprocessor can open a switch allowing power to be provided from the module to one of the busses based on the comparison of the of the determined coordinates to the predetermined course coordinates, allowing the appropriate indicator to be activated.

In another embodiment, the electric conductors can be connected with the housing by a pair of gates. The gates can have a Bluetooth actuator, a radio frequency actuator, or another wireless actuator. And the module can have one or more transmitters configured to send a signal to selectively actuate the gates. The gates can be connected to a power source in the housing. As such, the actuated gate can open a path for power to be provided to the indicator associated with the actuated gate. The power source can be a lithium battery, an alkaline battery, or another portable power source.

FIG. 1 depicts a schematic of the goggles.

The goggles 100 can include a frame 110. A first lens 120 can be operatively secured in the frame 110. And a second lens 125 can be operatively secured in the frame 110.

A first indicator 130 can be adjacent the first lens 120, and a second indicator 135 can be located adjacent the second lens 125.

A first strap portion 150 can be connected to the frame 110 proximate the first lens 120, and a second strap 155 portion can be connected to the frame 110 proximate the second lens 125. A housing 160 can be connected to the first strap portion 150 and the second strap portion 155.

The first strap portion 150 can have a first electric conductor 230 located therein.

The second portion 155 can have a second electric conductor 232 located therein.

The first conductor 230 can be configured to provide an electric path from the housing to an associated indictor, and the second conductor 232 can provide an electric path from the housing to another indicator.

Figure 2:
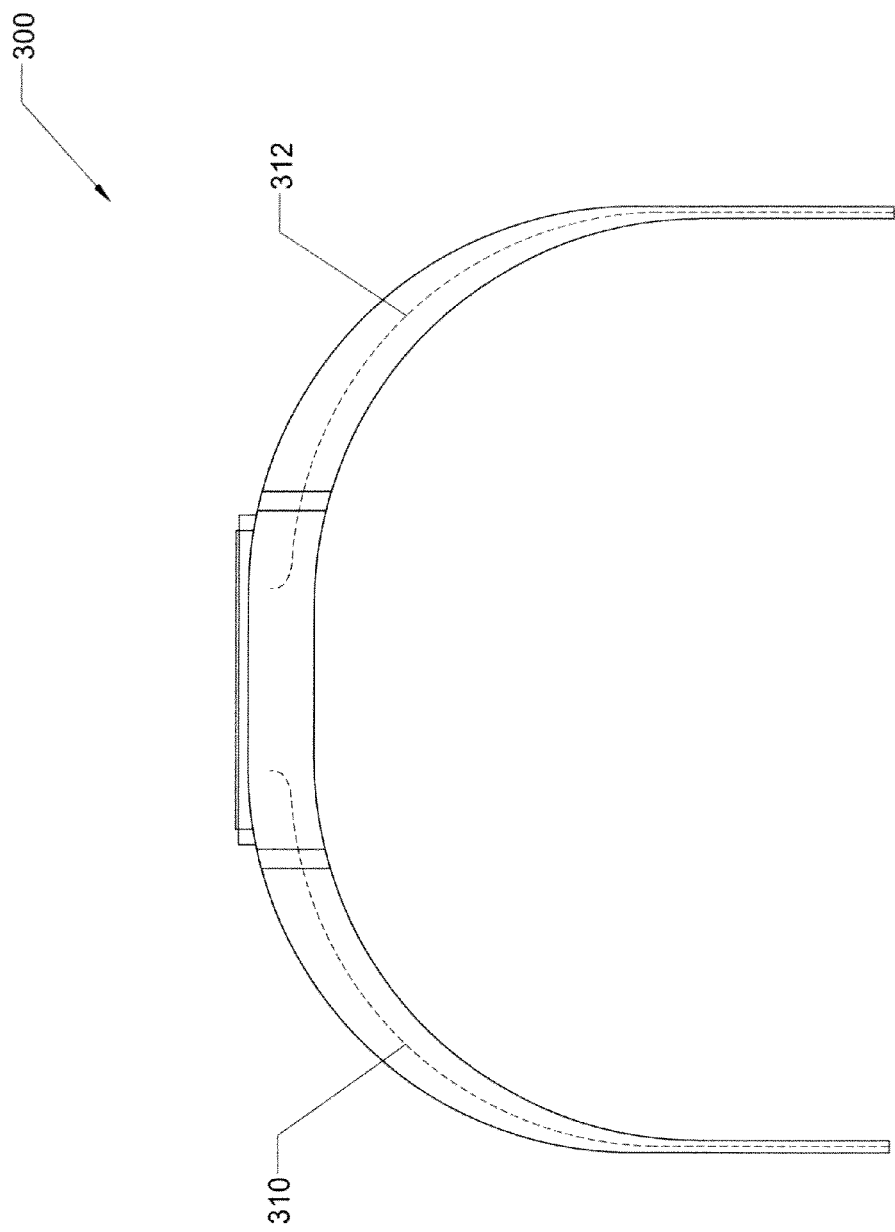
FIG. 2 depicts an embodiment of the strap.

FIG. 2 depicts an embodiment of the strap. The strap 300 is indicated as a single piece, but it can be a two piece strap.

The strap 300 can have a first integrated electric conductor 310 and a second integrated conductor 312. The first integrated electric conductor 310 can provide an electric communication path between the housing and an indicator, and the second integrated electric conductor 312 can provide an electric communication path between the housing and another indicator.

Figure 3B:
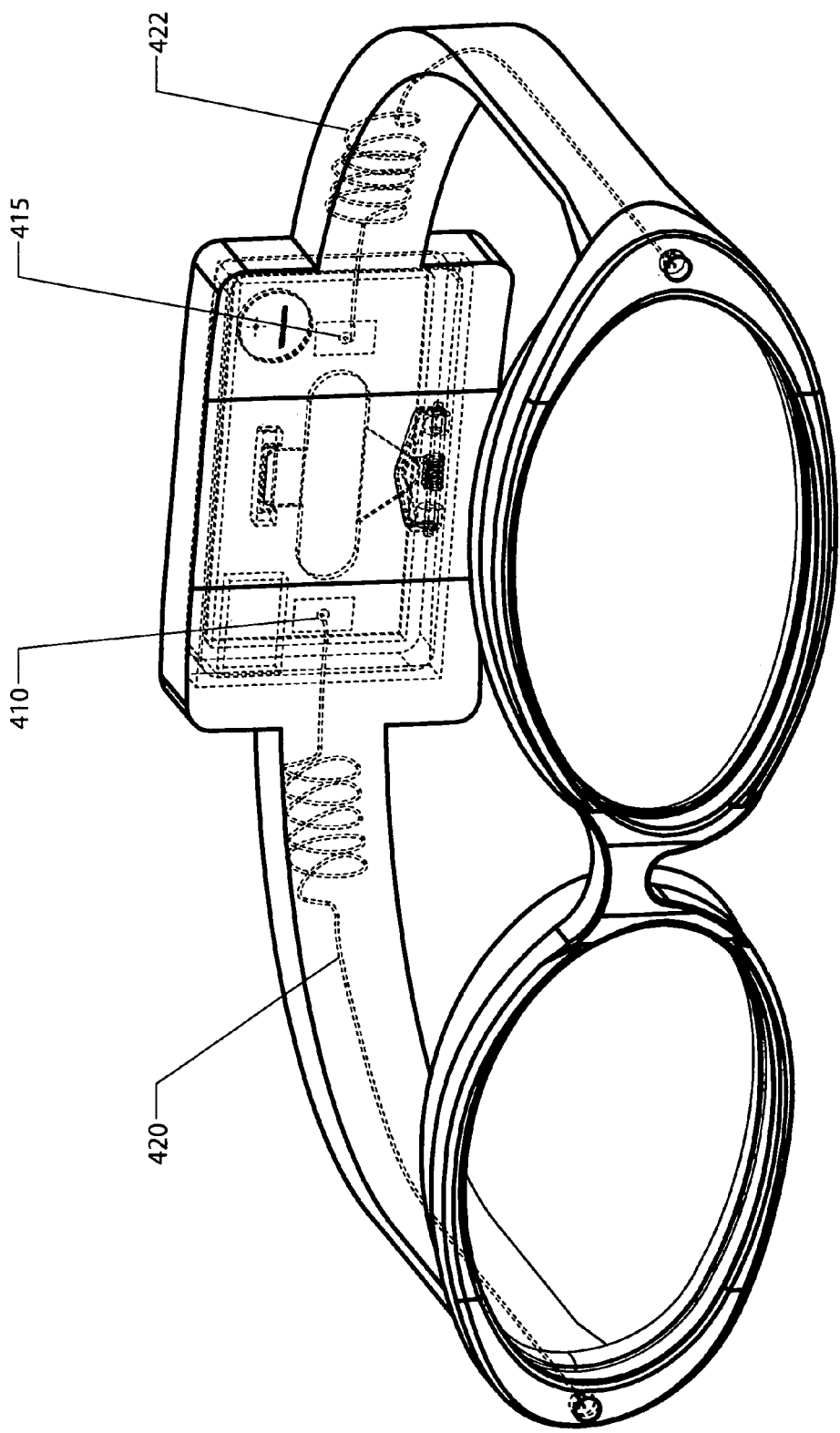
FIG. 3B depicts a transparent view of the goggles of FIG. 3A.

FIG. 3A depicts an embodiment of the goggles. FIG. 3B depicts a transparent view of the goggles of FIG. 3A.

Referring to FIGS. 3A and 3B, the housing 400 can include a first bus 410. The first bus 410 can connect to a first electric conductor 420. The second bus 415 can connect to a second electric conductor 422. The electric conductors 420 and 422 can be one described herein or another known to one skilled in the art with the aid of this disclosure.

The first bus 410 can have a first bus connector. The first bus connector can be configured to connect to a first module connector 460 on the GPS module 430. For example, the first bus connector can be a male connector and the module connector 460 can be a female connector.

The second bus 415 can have a second bus connector configured to connect to a second module connector 465 on the GPS module 430. For example, the second bus connector can be a male connector and the second module connector 465 can be a female connector.

The housing 400 can also have one or more latches 470 and 471 configured to latch the GPS module 430 into the housing. For example, the latches can secure to a retaining key 472. One of the latches 470 and 471 can be configured to selectively release from the retaining key. For example, one of the latches, such as latch 471 can be a spring loaded latch and an actuator, such as a button or lever, can be connected with the latch 471 and a wearer can activate the actuator to release the GPS module 430.

One or more seals can be disposed on the housing to form a seal between the GPS module 430 and the housing 400. For example, the housing can have a lip with a seal adjacent thereto, and the GPS module can be configured to sit on the lip, and when the GPS module is latched to the housing the GPS module can compress the seal forming a seal between the lip and the GPS module.

Figure 4:
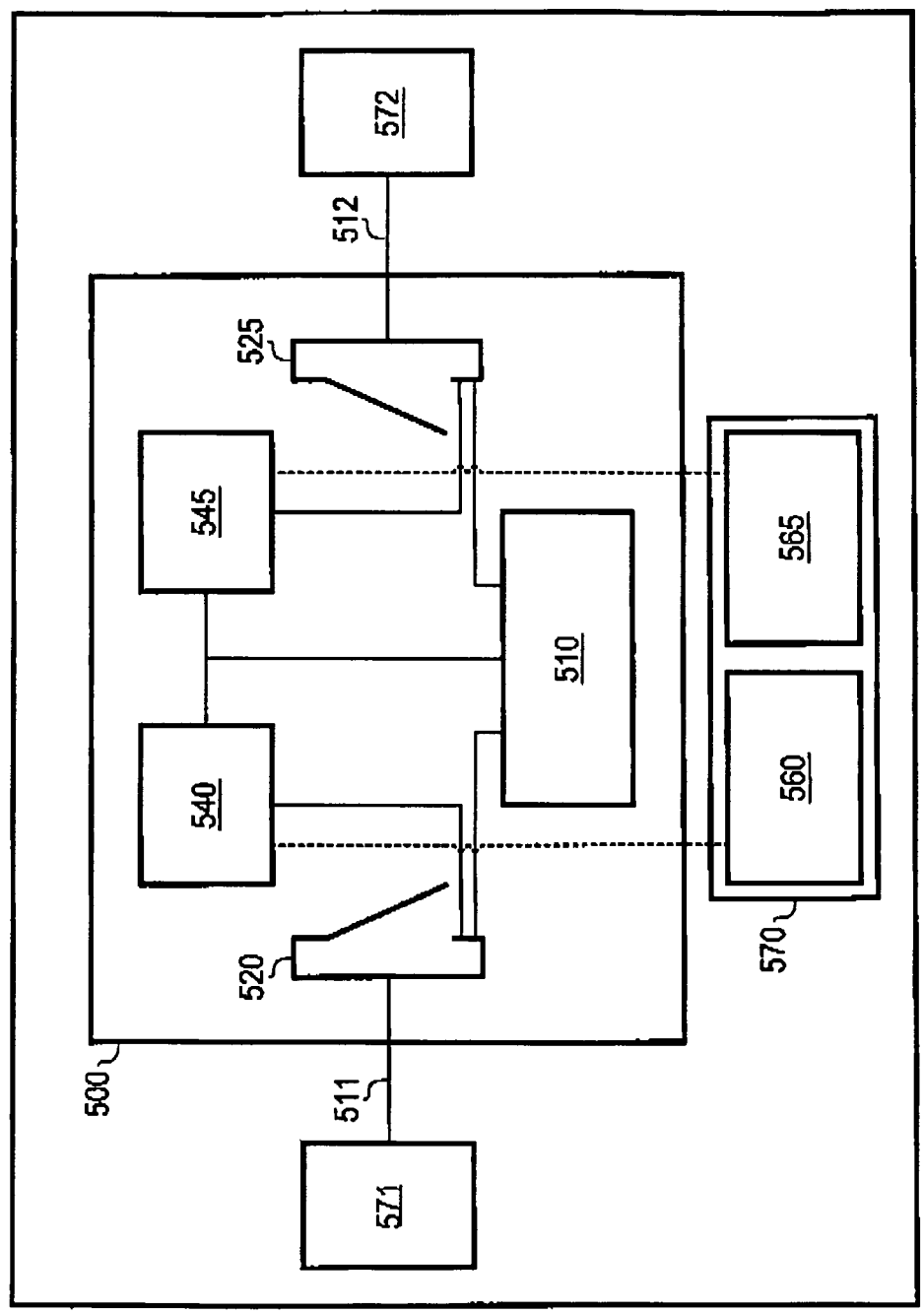
FIG. 4 depicts a schematic of the housing.

FIG. 4 depicts a schematic of the housing.

The housing 500 can have a power source 510 disposed therein. The power source 510 can be connected to a first gate 520 and a second gate 525.

The first gate 520 can be configured to receive an actuation signal from a first transceiver 560 on a GPS module 570 via a first wireless receiver 540.

The second gate 525 can have second wireless receiver 545. The second wireless receiver 545 can be configured to receive an actuation signal from a second transceiver 565 on the GPS module 570. The gates 520 and 525 can allow power to transfer to conductors 511 and 512, which can be in communication with indicators 571 and 572.

Figure 5:
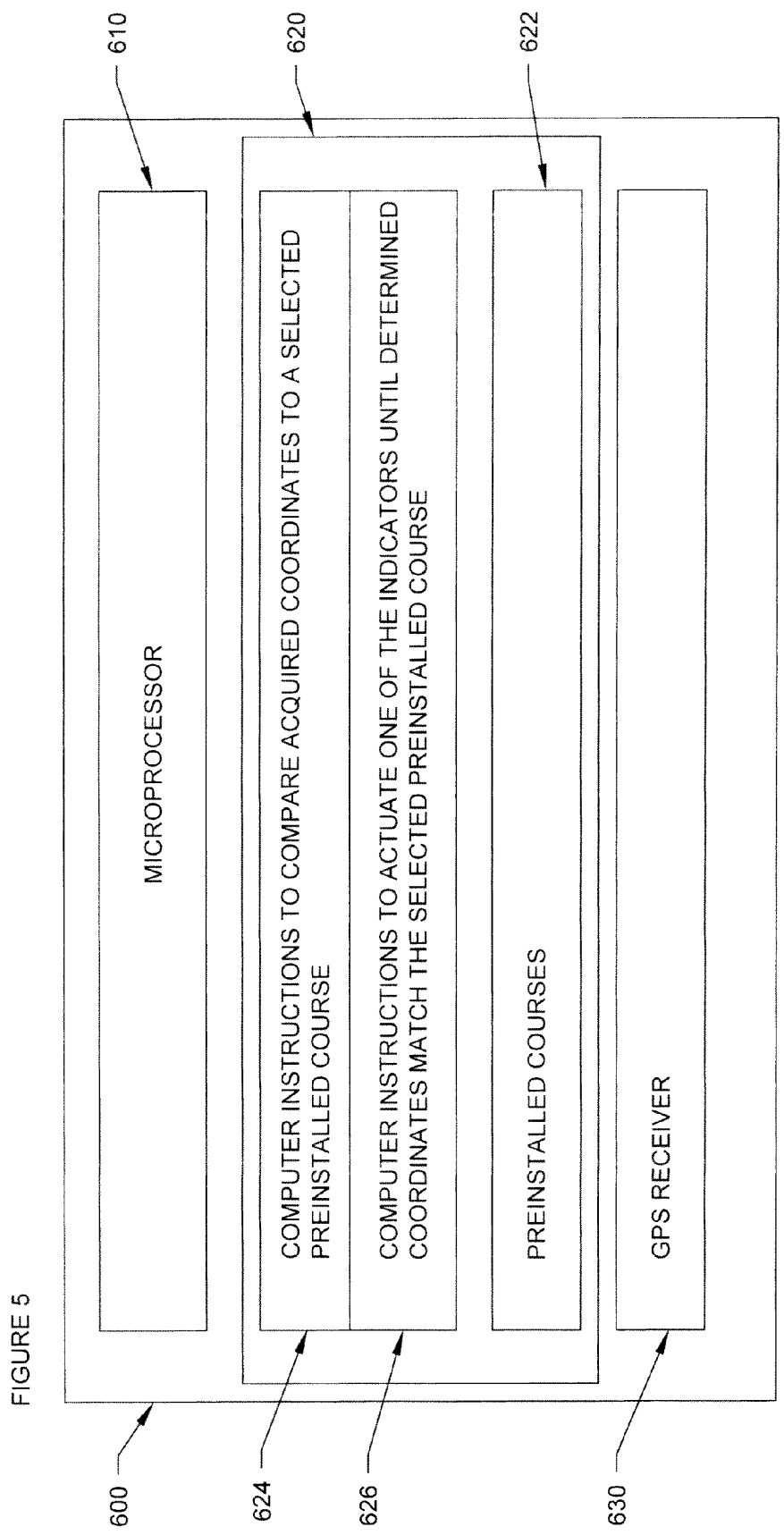
FIG. 5 depicts a schematic of an embodiment of the GPS module.

FIG. 5 depicts a schematic of an embodiment of the GPS module.

The GPS module 600 can include a microprocessor 610. The microprocessor 610 can be in communication with a data storage 620.

The data storage 620 can include one or more preinstalled courses 622. The data storage can also include computer instructions to compare acquired coordinates to a selected preinstalled course 624. The data storage 620 can also include computer instructions to actuate one of the indicators until determined coordinates match the selected preinstalled course 626.

For example, a GPS receiver 630 can acquire coordinates from a GPS satellite and can relay the acquired coordinates to the microprocessor. The computer instructions to compare acquired coordinates to a selected preinstalled course 624 can determine if the acquired coordinates are to the left, right, or match the coordinates of the selected preinstalled course 622. And the computer instructions to actuate one of the indicators until determined coordinates match the selected preinstalled course 626 can send actuate a left indicator if the acquired coordinates are to the left of the coordinates of the selected predetermined course, actuate the right indicator if the acquired coordinates are to the right of the coordinates of the selected preinstalled course, or do nothing if the acquired coordinates match the coordinates of the selected preinstalled course.

Figure 6:
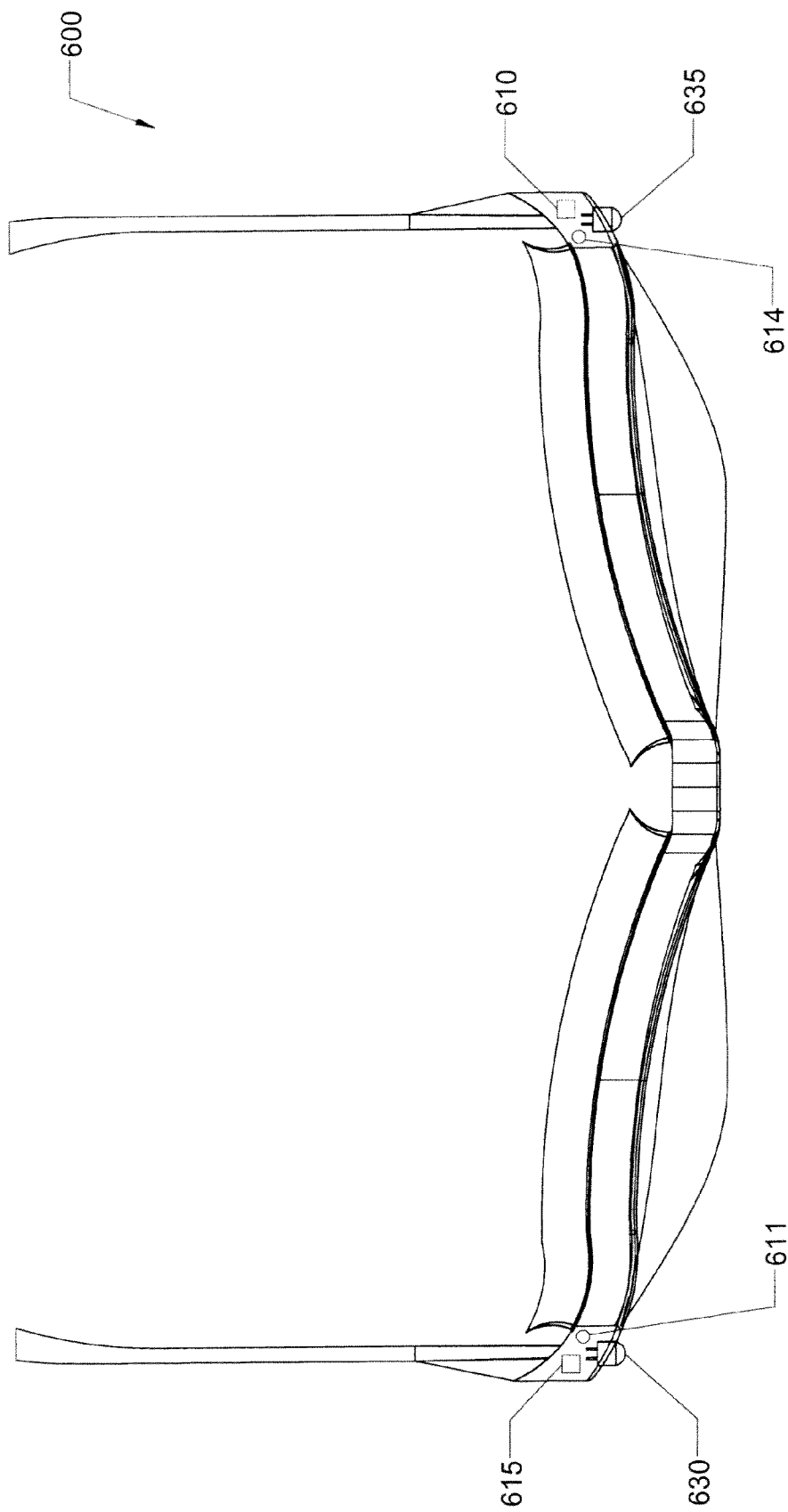
FIG. 6 depicts a schematic of another embodiment of the goggles.

FIG. 6 depicts a schematic of another embodiment of the goggles. The goggles 600 can be similar to those described herein. However, the left indicator 630 can be in communication with the GPS module via a left receiver 615, and the right indicator 635 can be in communication with the GPS module via a right receiver 610. The receivers 615 and 610 can be integrated in the frame of the goggles 600. A left power source 611 can power the left indicator 630 and the left receiver 615, and a right power source 614 can power the right indicator 635 and right indicator 610. The receivers 610 and 615 can receive actuation signals from the GPS module and can actuate the associated indicator when the actuation signal is received.

Figure 7:
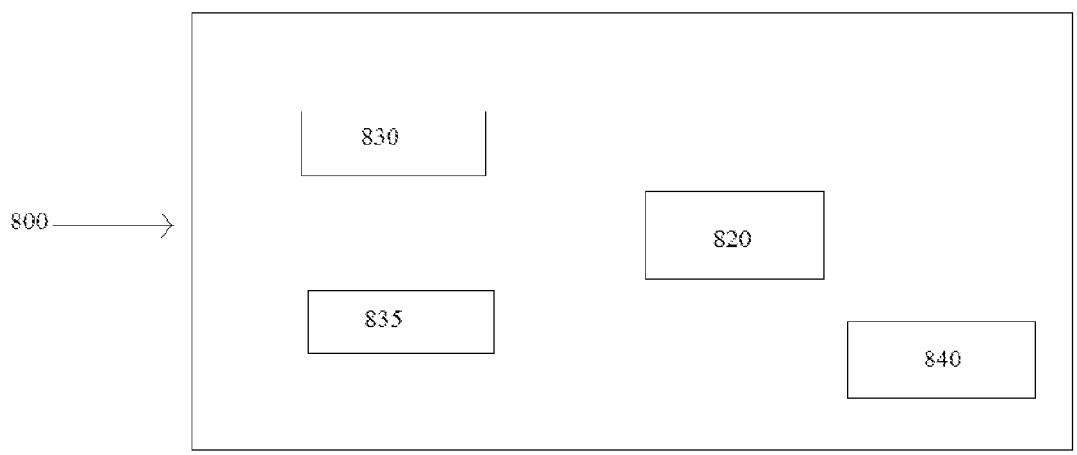
FIG. 7 depicts a schematic of another embodiment of the goggles.
Figure 8:
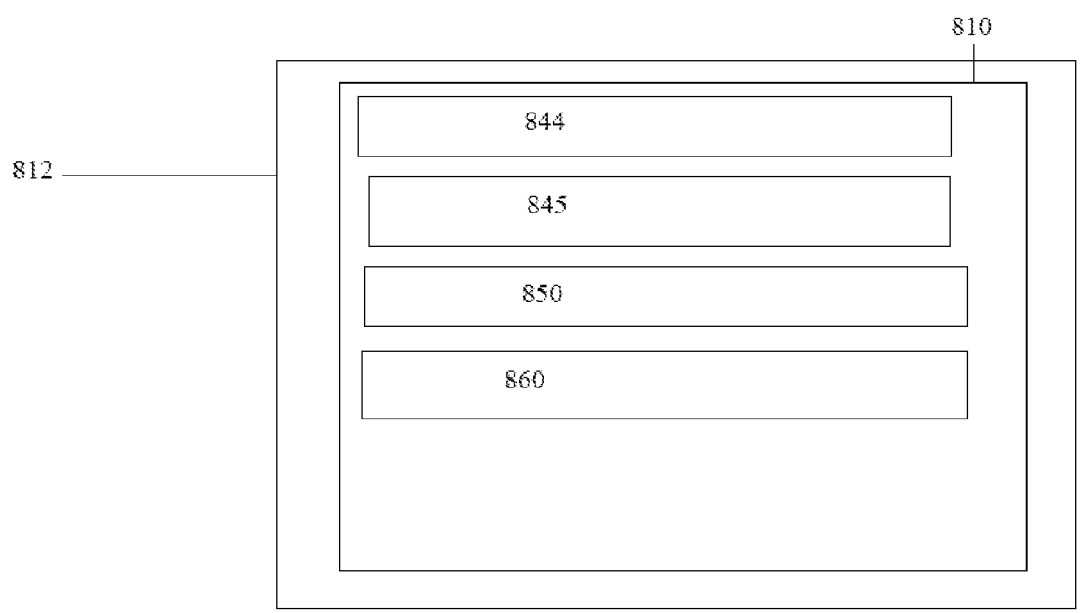
FIG. 8 depicts a schematic of the microprocessor.

FIG. 7 depicts a schematic of another embodiment of the goggles. FIG. 8 depicts a schematic of the microprocessor.

The goggles 800 can include a microprocessor 810, a receiver 820, a first indicator 830, a second indicator 835, and a power source 840.

The microprocessor 810 can be stored in a housing 812. The housing 812 can be configured to keep electronic components of the microprocessor safe from water. The microprocessor can have communication computer instructions 844, location computer instructions 845, prioritization computer instructions 850, and actuation computer instructions 860.

The communication computer instructions 844 can provide the microprocessor with information required to communicate with different telemetries.

The location computer instructions 845 can use triangulation, identification, or other signal sensing to determine the location of the goggles relative to the signal producing apparatus.

The prioritization computer instructions 850 can provide information that a first signal, for example, within a first range, is the first target location and so on.

The actuation computer instructions 860 can issue a signal to direct the goggles to a determined signal. For example, the actuation signals can be actuated until a first signal device, first transceiver, is reached, and then the actuation direction can direct the goggles to a second signal device, a second transceiver, until the goggles reach the second transceiver. This can continue until the goggles have reached each transceiver based on a predetermined signal identification sequence.

Figure 9:
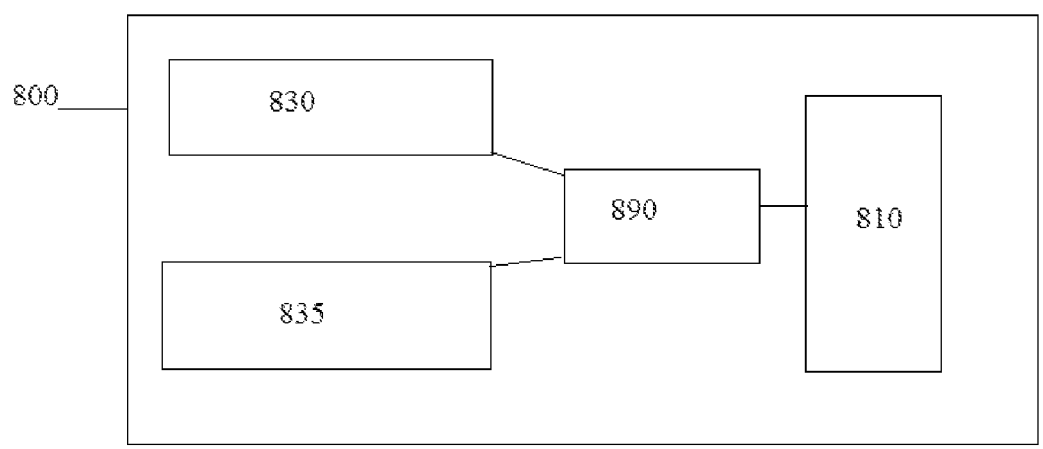
FIG. 9 depicts the goggles in communication with indicators via wireless communication.

FIG. 9 depicts the goggles in communication with indicators via wireless communication.

The goggles 800 can include the microprocessor 810. The microprocessor 810 can communicate with a transceiver 890. The transceiver 890 can receive signals from the microprocessor 810 and relay the signals to the indicators 830 and 835.

Figure 10:
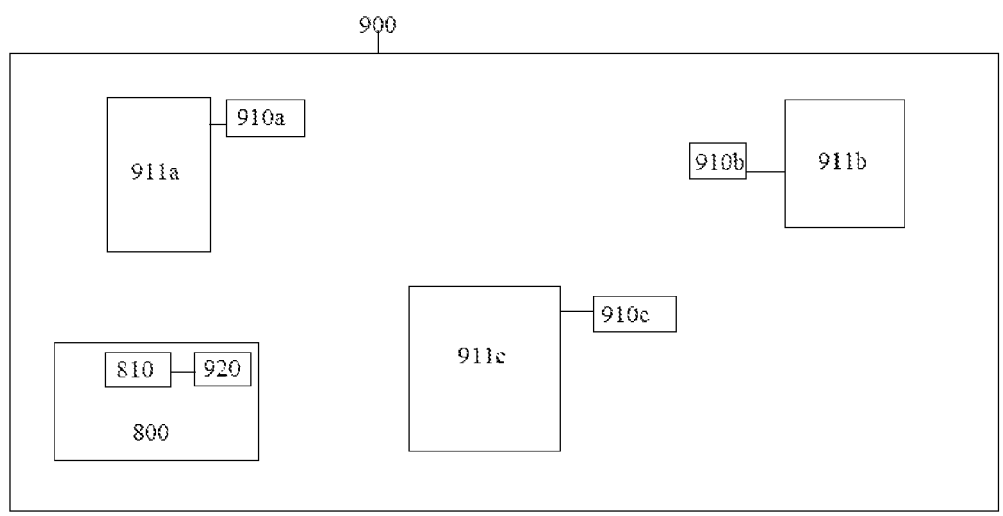
FIG. 10 depicts a schematic of a system for use with the goggles.

FIG. 10 depicts a schematic of a system for use with the goggles.

The system 900 can include a plurality of transceivers or signal senders, such as signal senders 910a, 910b, and 910c. The signal senders can send radio signals, laser signals, or the like. The signal senders can be connected with buoys 911a, 911b, and 911c. The signal senders can be similar to those used as avalanche transmitters for skiers. The goggles can have a receiver 920. The receiver 920 can communicate with the microprocessor 810, and the microprocessor can use the signals to determine the location relative to the signal senders.

The system can include a first buoy having a first signal sender, a second buoy having a second signal sender, and a third buoy can have a third signal transceiver. The microprocessor on the goggles can have prioritization computer instructions.

The first signal sender can send a signal at a first frequency, the second signal sender can send a second signal at a second frequency and the third signal can send a signal at a third frequency. For example, the first frequency can be 100 hertz, the second frequency can be 200 hertz, and the third frequency can be 300 hertz. The prioritization computer instructions can instruct the microprocessor, for example using preinstalled information, to go to the 100 hertz frequency first, the 200 hertz frequency second, and the 300 hertz frequency third. The transceiver on the goggles can receive the signals from the signal senders and the microprocessor, using software similar to those on avalanche beacons, can use the received signals to direct a wearer by activating the indicators on the goggles to the signal senders in the predetermined order.

While this invention has been described with emphasis on the preferred embodiments, it should be understood that within the scope of the appended claims the invention might be practiced other than as specifically described herein.

What is claimed is:

1. Goggles for use in water comprising:
   a. a frame;
   b. a first lens operatively secured in the frame;
   c. a second lens operatively secured in the frame;
   d. a first indicator adjacent the first lens;
   e. a second indicator adjacent the second lens; and
   f. a housing connected with both ends of the frame, wherein a microprocessor is located within the housing, and wherein the microprocessor is configured to receive input from a receiver, GPS module, or both, and wherein the receiver, GPS module, or both are at least partially located in the housing, wherein the microprocessor has a preinstalled course installed therein, and wherein the processor is configured to compare the input from the receiver, GPS module, or both to the preinstalled course and selectively actuate one of the indicators until determined coordinates match the selected preinstalled course.

2. The goggles of claim 1, wherein the housing is in communication with the indicators through a first gate and a second gate, wherein the first gate is in communication with the first indicator and the second gate is in communication with the second indicator.

3. The goggles of claim 2, further comprising a power source in the housing, wherein the power source is in electric communication with the gates.

4. The goggles of claim 2, wherein the housing is in communication with the indicators by a first bus and a second bus.

5. The goggles of claim 1, wherein the housing is connected to each end of the frame by an adjustable strap, and wherein a power conductor runs through the adjustable strap from the housing to the first indicator, and wherein another power conductor runs through the adjustable strap from the housing to the second indicator.

6. The goggles of claim 5, wherein the adjustable strap is a two piece adjustable strap.

7. The goggles of claim 1, wherein the housing is connected to each end of the frame by an adjustable strap, wherein at least a portion of the adjustable strap is a power conductor in communication with the first indicator, and wherein at least another portion of the adjustable strap is another power conductor in communication with the second indicator.

8. Goggles for use in water comprising a pair of indicators configured to be actuated by a microprocessor, wherein the microprocessor is configured to actuate the indicators dependent on the location of the goggles relative to a destination, wherein the microprocessor is configured to receive input from a receiver, GPS module, or both, and wherein the receiver, GPS module, or both are at least partially located in a housing connected with the indicators, wherein the microprocessor has a preinstalled course installed therein, and wherein the processor is configured to compare the input from the receiver, GPS module, or both to the preinstalled course and selectively actuate one of the indicators until determined coordinates match the selected preinstalled course.

9. The goggles of claim 8, wherein the microprocessor determines the location of the goggles relative to the destination by receiving input from a receiver, and wherein the receiver receives signals from a transmitter at the destination.

10. The goggles of claim 9, wherein the microprocessor is configured to identify and differentiate signals from a plurality of destinations.

11. The goggles of claim 8, wherein the microprocessor determines the location of the goggles relative to the destination by comparing GPS coordinates with a preinstalled map.

12. A method of directing a swimmer along a predetermined path, wherein the method comprises: communicating at least one signal with a microprocessor connected with a pair of goggles, wherein the goggles have a first indicator and a second indicator connected therewith, wherein the microprocessor is configured to receive input from a receiver, GPS module, or both, and wherein the receiver, GPS module, or both are at least partially located in a housing connected with the pair of goggles, wherein the microprocessor has a preinstalled course installed therein, and wherein the processor is configured to compare the input from the receiver, GPS module, or both to the preinstalled course and selectively actuate one of the indicators until determined coordinates match the selected preinstalled course.

13. The method of claim 12, wherein the at least one signal comprises a plurality of signals, wherein one of the signals is an initial signal associated with the initial destination, wherein another of the signals is a second signal.

\* \* \* \* \*